US009115914B2

(12) United States Patent
Lokurlu (10) Patent No.: US 9,115,914 B2
(45) Date of Patent: Aug. 25, 2015

(54) COLLECTOR AND COLLECTOR ARRANGEMENT FOR GENERATING HEAT FROM INCIDENT RADIATION

(76) Inventor: Ahmet Lokurlu, Aachen (DE)

(*) Notice: Subject to any disclaimer, the term of this patent is extended or adjusted under 35 U.S.C. 154(b) by 2000 days.

(21) Appl. No.: 11/912,078

(22) PCT Filed: Apr. 21, 2006

(86) PCT No.: PCT/IB2006/051246
§ 371 (c)(1),
(2), (4) Date: Jun. 23, 2008

(87) PCT Pub. No.: WO2006/111940
PCT Pub. Date: Oct. 26, 2006

(65) Prior Publication Data
US 2008/0276930 A1    Nov. 13, 2008

(30) Foreign Application Priority Data
Apr. 21, 2005   (DE) .......................... 10 2005 018 657

(51) Int. Cl.
*F24J 2/10* (2006.01)
*F24J 2/46* (2006.01)

(52) U.S. Cl.
CPC .............. *F24J 2/1047* (2013.01); *F24J 2/4638* (2013.01); *Y02E 10/40* (2013.01)

(58) Field of Classification Search
CPC ............. F24J 2/10; F24J 2/085; F24J 2/0007; F24J 2/0488; F24J 2/1047; F24J 2002/1004; F24J 2002/1009
USPC ......... 126/569–600, 621–651, 674, 684–696, 126/683; 136/248

IPC ............................................................ F24J 2/10
See application file for complete search history.

(56) References Cited

U.S. PATENT DOCUMENTS

| 3,058,394 A * | 10/1962 | Edlin ............................ 359/853 |
| 3,982,527 A * | 9/1976 | Cheng et al. .................. 126/690 |
| 4,011,857 A * | 3/1977 | Rice .............................. 126/674 |
| 4,022,184 A * | 5/1977 | Anderson ..................... 126/573 |
| 4,050,444 A * | 9/1977 | Dolamore ..................... 126/694 |
| 4,065,053 A * | 12/1977 | Fletcher et al. ............... 237/1 R |
| 4,079,724 A * | 3/1978 | Zwillinger ..................... 126/658 |
| 4,116,224 A * | 9/1978 | Lupkas ......................... 126/660 |
| 4,120,282 A * | 10/1978 | Espy ............................. 126/684 |
| 4,131,336 A * | 12/1978 | Frosch et al. ................ 359/852 |
| 4,149,521 A * | 4/1979 | Fletcher et al. ............... 126/693 |
| 4,149,817 A * | 4/1979 | Fletcher et al. ............... 405/229 |
| 4,212,290 A * | 7/1980 | Warnken ...................... 126/684 |
| 4,317,031 A * | 2/1982 | Findell ........................ 250/203.4 |
| 4,340,031 A * | 7/1982 | Niedermeyer ................ 126/600 |

(Continued)

*Primary Examiner* — Jorge Pereiro
(74) *Attorney, Agent, or Firm* — Venjuris P.C.

(57) ABSTRACT

The invention relates to a collector and a collector arrangement for generating heat, especially from incident radiation. In principle, such collectors and collector arrangements are know in prior art. An individual collector known in prior art typically comprises of a reflector device (110) for reflecting the incident radiation onto one focusing zone (120-1) of the reflector device (110). A typical collector further comprises an absorber device that is disposed in the focusing zone. In order to provide the reflector device with great inherent stability, particularly against wind and torsion, the inventive reflector device is embodied with a plurality of facet elements (110-I-i, 110-II-n) which are placed at an angle from each other such that the reflector device (110) has a zigzag shaped file (116).

6 Claims, 5 Drawing Sheets

(56) References Cited

U.S. PATENT DOCUMENTS

| | | | |
|---|---|---|---|
| 4,344,673 A * | 8/1982 | Holdridge | 359/852 |
| 4,410,757 A * | 10/1983 | Stamminger et al. | 136/248 |
| 4,419,984 A * | 12/1983 | McIntire | 126/657 |
| 4,432,345 A * | 2/1984 | McIntire | 126/694 |
| 4,498,455 A * | 2/1985 | Gramm | 126/569 |
| 4,509,825 A * | 4/1985 | Otto et al. | 359/592 |
| 4,513,734 A * | 4/1985 | Butler | 126/683 |
| 4,583,521 A * | 4/1986 | Ciambella et al. | 126/682 |
| 4,676,227 A * | 6/1987 | Walters | 126/713 |
| 4,800,868 A * | 1/1989 | Appeldorn et al. | 126/692 |
| 5,184,396 A * | 2/1993 | Claypool | 29/726 |
| 5,245,986 A * | 9/1993 | Karni | 126/680 |
| 5,538,563 A * | 7/1996 | Finkl | 136/246 |
| 5,851,309 A * | 12/1998 | Kousa | 136/248 |
| 5,899,199 A * | 5/1999 | Mills | 126/577 |
| 6,131,565 A * | 10/2000 | Mills | 126/577 |
| 6,237,241 B1 * | 5/2001 | Aaron et al. | 33/613 |
| 6,349,718 B1 * | 2/2002 | Ven et al. | 126/685 |
| 6,612,705 B1 * | 9/2003 | Davidson et al. | 359/851 |
| 2004/0261786 A1* | 12/2004 | Kirk | 126/600 |
| 2011/0067688 A1* | 3/2011 | Reif et al. | 126/600 |

* cited by examiner

Prior Art

COLLECTOR AND COLLECTOR ARRANGEMENT FOR GENERATING HEAT FROM INCIDENT RADIATION

BACKGROUND

1. Field

The invention regards a collector as well as a collector arrangement for the generation of heat from incident, preferably solar radiation.

2. State of the Art

The efforts made for the use of fossil have led to a strong development of alternative energy systems. Solar energy plays a crucial part in these developments. Regarding the use of solar energy currently common, many different processes for the generation of heat for various applications have emerged besides the photovoltaic conversion of solar radiation. The most common thermotechnical process is the generation of low-temperature heat up to between 90 and 100° C. in non-concentrating solar collectors. Though non-concentrating, i.e. non-focusing collectors can produce higher temperatures up to about 150° C., the technical effort is inadequately high however. With increasing temperature level, the heat losses increase disproportionately. Through this, the degree of efficiency of these collectors becomes very low and the production of solar energy decreased drastically.

As many applications, such as e.g. in solar thermal plant technology, require much higher temperatures than those produced by non-focusing collectors, concentrating—i.e. focusing collectors have been developed in the past. Here, the solar radiation is—with the help of concentrating reflectors—led onto a focus point or a focus axis spread lengthwise along the reflectors. In doing so, the radiation is conversed into heat within an extremely small area. The surface on which the heat can be lost to the surrounding through conduction or convection is thereby reduced to a fraction of the total surface of the reflector. In a corresponding manner, the heat losses of a concentrating collectors will be reduced as opposed to a non-concentrating collector.

Concentrating collectors for the generation of heat from solar energy are very often constructed as parabolic trough collectors. The worldwide largest applications are solar farm plants where solar heat is used for the heating of a heat carrier (mostly thermal oil).

The heat carrier transfers the solar heat it receives to a steam power process. The high temperature need for this requires a high concentration of the solar radiation.

Figure 8:
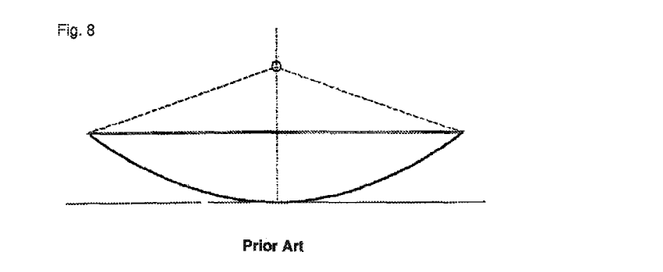
FIG. 8 a concentrating collector according to the state of the art.

The parabolic trough collectors consist of an elongated reflector 110 with a parabolic profile in its lengthwise direction; see FIG. 8. In the focus axis of the reflector sits a absorber tube through which flows a heat carrier medium. The heat carrier medium absorbs the heat received by the tube and transports it to a heat consumer, for example a thermal power plant. Besides in such a power plant technology, parabolic trough collectors are also used to generate space heating and process heat.

The requirements to the construction of the parabolic trough collectors result from the physical principle of concentration or focusing respectively. Thus, the outline of the reflector must show high precision so that the reflected rays meet the absorber tube. If the geometry is imprecise, a considerable amount of reflected rays will not reach its goal and considerable output losses and correspondingly lower degrees of efficiency follow.

The principle of concentration requires also a precise tracking of the collectors. The collectors are then always positioned so that the reflectors are constantly aligned orthogonally to the incident solar radiation.

The parabolic trough collectors are elongated troughs. Mostly, they are serially connected in several rows into a larger collector field. Through each collector's length, additional deformations of the reflectors can be caused by torsion powers that also could lead to mis-focusing. In order to prevent this, special construction measures are chosen that avoid a torsion of the parabolic trough. Thus, some construction types use torsion tubes or intricate steel grid constructions on the back of the mirror with whose help the entire construction consisting of reflector and absorber tube is protected against deformation through torsion or wind powers.

The collector is at times exposed to strong wind. The wind powers also require an inherently stable construction of the collector, as the reflector will otherwise be deformed by the wind powers and the focus line of the absorber tube will be shifted. The parabolic trough collectors used in industrial plants and solar power plants are therefore protected against wind power deformation by intricate auxiliary constructions. These intricate auxiliary constructions for the protection of the reflectors' form stability require a high expenditures of material as opposed to the reflectors themselves and their production is—due to this high expenditure of material as well as due to the complex construction—cost intensive.

Therefore, they make the production of the entire collectors and especially the production of an entire solar energy plant disproportionally more expensive.

SUMMARY

Task

Starting from the state of the art described, the invention is based on the task to supply a reflector device for a collector or for collectors in a collector arrangement that already have such a form stability that no considerable additional efforts are necessary to increase the form stability of the reflector.

Solution

This task is solved by the subject of patent claim no. 1. This is characterised through the fact, that the reflector appliances claimed comprises of a number of facet elements that are arranged against each other in such an angle that the reflector device has a zigzag formed profile and that the facet elements of a first group out of the multitude each have a reflecting surface and are arranged in a way that make them reflect the incident radiation hitting their reflecting surface via different focal lengths into the common first focusing zone of the reflector appliance.

This claimed design of the reflector device with a multitude of facet elements arranged in a zigzag form offers the advantage of a high inherent stability. Due to this inherent and form stability, the reflector device is advantageously in its form at least as stable as possible or resistant against possibly attacking wind or torsion forces without needing to be enforced by additional mechanical measures. The reflector device is therefore very inexpensive in production.

According to an alternative design example of the reflector appliance, the fact elements of a second group out of a multitude of facet elements are designed to be heat absorbing on their upper side facing the radiation and they have on their underside not facing the incident radiation a facet element absorber device which dissipates the heat that has been absorbed especially on their upper side. Through this, an alternative advantageous possibility is offered to use the additional heat through the facet elements of the second group which do not focus the radiation onto the first focusing zone.

A second alternative to use the heat with the help of the facet elements of the second group is to design their surface facing the incident radiation as reflecting and position them in a way that the facet elements reflect the incident radiation onto a common second focusing zone of the reflector appliance. In this second focusing zone the heat could be used advantageously with the help of a second absorber appliances installed here.

As an alternative to a second absorber appliance, at least one side reflector device can be designed that divert or reflect the radiation reflected by the facet elements of the second group preferably onto the first focusing zone before they hit the second focusing zone. The design of a side reflector device can be save space as opposed to a second absorber device in the second focusing zone.

In order to reach a high degree of efficiency it is advantageous to realize a concentration or focussing of the radiation which is as high as possible; therefore, the different facet elements have a parabolic profile. A flat profile is possible as well, however it offers a lower degree of efficiency in comparison to the parabolic profile.

In the side area of the reflector appliance, i.e. outside the facet area, the reflector device can have homogenous profile which should preferably be arranged in a way that allows the incident radiation there to be reflected as well onto one of the reflector appliance's focusing zones. The first or the second absorber device and/or the facet element absorber device on the underside of the facet elements of the second group are preferably aligned similarly. All these absorber appliances typically have a flow channel, for example in the form of a tube, in which flows a heat carrier, e.g. thermal oil, to absorb and transport the energy from the heat gained or absorbed from the radiation.

As an advantage, the reflector device with the facet elements is designed to stretch across one plane. As opposed to known parabolic trough collectors the reflector device in this invention therefore requires considerably less space due to its lesser total height.

Another advantage is that the reflector device can be designed with the facet elements arranged in a circle or alternatively elongated, depending on the space demand or the desired design. If the reflector device design is circular, the first focusing zone is naturally mostly globular or point-shaped while the second focusing zone is ringlike. Correspondingly, the facet element absorber appliances and/or the second absorber device in the second focusing zone are ringlike and concentrical with the reflector appliance. In opposition to this, in the elongated design of the reflector appliance, the first as well as the second focusing zone and the appropriate absorber appliances are elongated as well, preferably tubular. The reflector device is preferably made of metal plate, e.g. aluminium plate. It can then be produced very easily in large quantities and at low productions costs and at the same time high production precision with the help of metal presses with corresponding embossing tools.

The task of the invention mentioned above is solved also by the collector arrangement according to the following:

A Collector arrangement (200) with a number of collectors (100) characterized by the fact that at least a part of the collectors (100) is designed according to one of the claims 1-15 below:

1. Collector (100) for the generation of heat from incident, preferably solar radiation, comprising:

a reflector device (110) to reflect the incident radiation onto at least a first focusing zone (130-1) of the reflector appliance;
   and
   an absorber device (120) located within the first focusing zone, which is heated up by the reflected radiation and which is designed to transport the heat;
   characterized by the fact, that
   the reflector device (110) comprises of a multitude of facet elements (110-I-i; 110-II-n) which are aligned towards each other in such an angle that the reflector device (110) has a zigzag shaped profile (116); and that the facet element (110-I-i) in a first group (I) out of a multitude each have a reflecting surface and are aligned in such a way that they reflect the incident radiation hitting their reflecting surface via different focal lengths onto a common first focusing zone (130-1) of the reflector device (110).

2. Collector (100) according to claim 1, characterized by the fact that the facet elements (110-II-n) in a second group (II) out of a multitude each have a heat absorbing upper side O facing the incident radiation, and have at their under side U not facing the incident radiation a facet element absorber device (140) in order to transport the heat especially absorbed on the upper side O.

3. Collector (100) according to claim 1, characterized by the fact that the facet elements) 110-II-n) in a second group (II) each have a surface facing the incident radiation and are aligned within the reflector device in such a way that they reflect the incident radiation hitting their reflecting surface via different focal lengths onto a common second focusing zone (130-2) of the reflector device (110).

4. Collector (100) according to claim 3, characterized by a second absorber device (122, 124) located in the second focusing zone that transport the heat gathered there.

5. Collector (100) according to claim 3, characterized by a side reflector device (112, 114) aligned in the path of rays of the radiation reflected by the facet elements of the second group (II), that diverts the reflected radiation preferably onto the first focusing zone (130-1).

6. Collector (100) according to one of the aforementioned claims, characterized by the fact, that especially the reflecting surface of the facet elements (110-I-i, 110-II-n, 110-III-k) have at least in part a parabolic or a plane profile.

7. Collector (100) according to one of the aforementioned claims, characterized by the fact that the reflector device has—outside of the facet area built by the multitude of facet elements—a parabolic profile (118).

8. Collector (100) according to one of the aforementioned claims, characterized by the fact, that the first, the second and/or the facet element absorber device (120-1, 120-2. 120-3, 120-4) each have a flow channel, preferably tubular, in which flows a heat carrier in order to absorb and transport the heat generated from the heat of the radiation.

9. Collector (100) according to one of the aforementioned claims, characterized by the fact that the reflector device (110) with the facet elements (110-I-i, 110-II-n, 110-II-k) is designed as elongated in one plane.

10. Collector (100) according to one of the aforementioned claims, characterized by the fact that the reflector device (110) is designed circular with the separate facet elements (110-I-i, 110-II-n) in the form of a concentrical truncated shaped ring, so that the first focusing zone is basically point-shaped.

11. Collector (100) according to claim 10, characterized by the fact that the flow channel of the facet element absorber device (140) and/or the first and second absorber device (122, 124) is designed at least basically in a ring-shape and concentrical with the the reflector device (110).

12. Collector (100) according to claim 1-9, characterized by the fact that the reflector device is designed to stretch along a longitudinal axis with the separate facet elements each forming lines parallel to the longitudinal axis, so that the first and/or the second focusing zone represent one focussing axis each.

13. Collector (100) according to claim 11, characterized by the fact that the flow channel of the absorber device (120), the facet element absorber appliance (140) and/or the side absorber device (122, 124) is designed to run parallel to the longitudinal axis of the reflector appliance.

14. Collector (100) according to one of the aforementioned claims, characterized by the fact that the reflector device (110) with the facet elements (110-I-i, 110-II-n, 110-III-k) is made of metal plate, e.g. aluminium plate, preferably embossed.

15. Collector (100) according to one of the aforementioned claims, characterized by the fact that the collector (100) has a rack in which the reflector device (110) is mounted—preferably hung—preferentially together with at least the first absorber device (120) and the second absorber device (122, 124) or the side reflector device (112, 114).

The advantages of this solution correspond mainly to the advantages described above regarding the collectors. In addition, it is advantageous to arrange especially the neighbouring collectors in the collector arrangement at least in parts in such a way that some of their focusing zones overlap. Thus, absorber appliances can be saved as then only one absorber device will be required for several overlapping focusing zones.

Other advantageous designs of collectors and the collector arrangement are subject to the subclaims.

BRIEF DESCRIPTION OF THE DRAWINGS

The description of the total of a eight figures is attached, with them showing

DETAILED DESCRIPTION

Design Examples

The invention is described in detail in the following through design examples in accordance with the mentioned FIGS. 1 to 7 and 9 to 10. Similar elements are marked with similar reference signs in the figures.

In all figures it is always assumed that radiation, especially solar radiation, hits the shown collectors preferably vertically from above; in order to simplify the demonstration this incident radiation is not shown.

Figure 1:
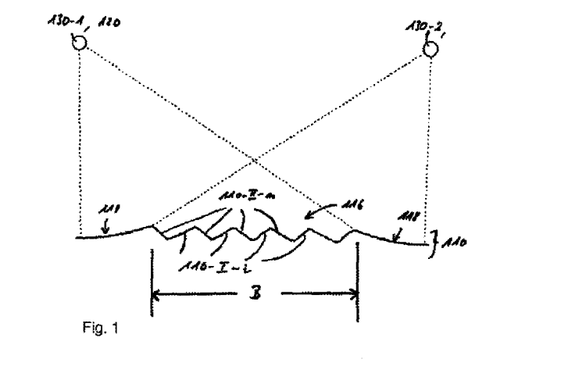
FIG. 1 a collector according to the invention.

FIG. 1 shows an example for the collector 100 according to the invention. It serves to generate heat from indicent solar radiation. It comprises of a reflector device 110 with a multitude of facet elements 110-I-i and 110-II-n, in which i . . . n represent each a natural number. According to the invention, in the reflector device 110 the different facet elements are arranged against each other in an angle so that the zigzag or fan-shaped profile 116 shown in FIG. 1 derives for the reflector appliance. In order to simplify the following descriptions, the facet elements are divided into a first group I and a second group II, with the elements of the first group run in FIG. 1 from the lower left side to the upper right side and the facet elements of group II run from the upper left side to the lower right side.

In general, the angle $\alpha$ between the tangents of two neighbouring facet elements can lie in their point of contact in the angle range of <180° and can be different for each point of contact. According to the invention, at least one group of facet elements must have a reflecting surface and arranged against the incident radiation within the reflector device in such a way that the incident solar rays are reflected onto a first focusing zone 130-1 allocated to the first group of facet elements. As can be seen from FIG. 1, the different facet elements each have a varying distance to their common first focusing zone 130-1 allocated to them, and they reflect therefore the incident solar rays each with different focal lengths onto the first focusing zone. The collector 200 has in the first focusing zone 130-1 an absorber device 120-1 which is heated by the reflected radiation and which is designed to dissipate the absorbed heat to a heat consumer, e.g. a thermal power plant, a heating system or a process.

To reach this, the absorber device 120-1 typically is designed in the form of a flow channel in which flows the heat carrier, e.g. a thermal oil, in order to dissipate the heat to the consumer. The flow channel can basically have any profile, though the flow channels with rectangular or triangular profile have proven better as opposed to flow channels with round profiles due to their larger absorber surface and the higher degree of efficiency caused by it. This possible design of the absorber device 120-1 is not shown in FIG. 1.

FIG. 1 shows a first alternative of the collector 100. This first alternative is characterized in the fact, that not only the facet elements 110-I-i of the first group but also the facet elements 110-II-n of a second group from the multitude of facet elements of the reflector device 110 have a reflecting surface. The facet elements of the second group also are aligned within the reflector appliance in a way that they focus the incident solar rays onto a second focusing zone 130-2 of the reflector device 110. Therefore, the reflector device shown in FIG. 1 has two focusing zones 130-1 and 130-2.

Also the second focusing zone 130-2 has a second absorber device 120-2 in order to additionally absorb the rays reflected from the facet elements of the second group II, the collector is therefore doubly efficient.

As furthermore shown in FIG. 1, the facet elements 110-I-i and 110-II-n are limited to the area B. Outside this area B, the reflector device 110 has preferably a homogenous parabolic profile 118, which is aligned so the incident radiation is also focused onto one of the two focusing zones 130-1 or 130-2.

Figure 2:
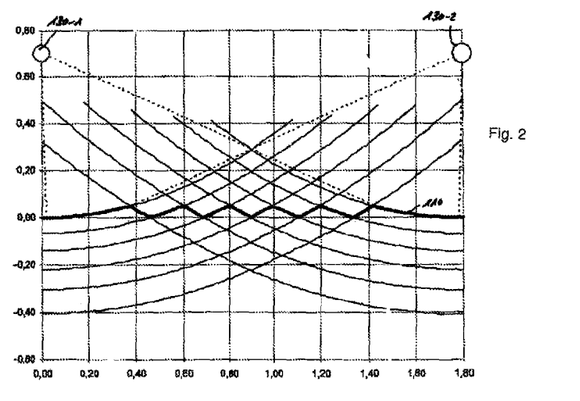
FIG. 2 a diagram to demonstrate the construction of the collector.

Preferably, the facet elements 110-I-i and 110-II-n which have a reflecting surface have a parabolic profile in order to realized the best possible concentration or focusing of the incident solar rays onto the first or second focusing zone 130-a and 130-2, see FIG. 2. If the width of each facet element is very small as compared to the total width of the reflector device 110, the design or the manufacturing of the facet elements 110-I-n, 110-II-n can be simplified by making the facet elements' profile not parabolic but with a flat surface. The focusing will then be slightly more imprecise or out of focus than with a parabolic profiled facet element and it will not form a line but a small band of reflected solar radiation on the absorber appliances 120-1 and 120-2. In order to assure that the depicted band of solar radiation is not to wide and the collector's degree of efficiency is not to low, the facet elements' width should be smaller than the diameter of the flow channel in the absorber appliance.

As can be seen from FIG. 1, the reflector device 110 is aligned mostly in one plane. As opposed to parabolic trough collectors it is therefore characterised by a lower total height and a smaller mounting volume resulting thereof.

Due to the zigzag formed facets, the reflector device 110 shown in FIG. 1 is especially stable against influencing deforming forces, without there being the need for support of stabilization through any additional intricate and cost intensive constructional measures. It can be efficiently produced in large quantities and at low productions costs and at the same time high production precision with the help of metal presses if these are equipped with corresponding embossing tools.

The reflector device shown in FIG. 1 is preferably designed in an elongated form along a longitudinal axis. Parallel to this longitudinal axis run the focusing zones 130-1 and 130-2 which are ideally designed as focusing lines (in FIG. 1 vertically to the drawing plane but not shown) as well as the tubular flow channels of the first and second absorber device 120-1 and 120-2 and the facet elements 110-I-i and 110-II-n formed in lines.

Figure 3:
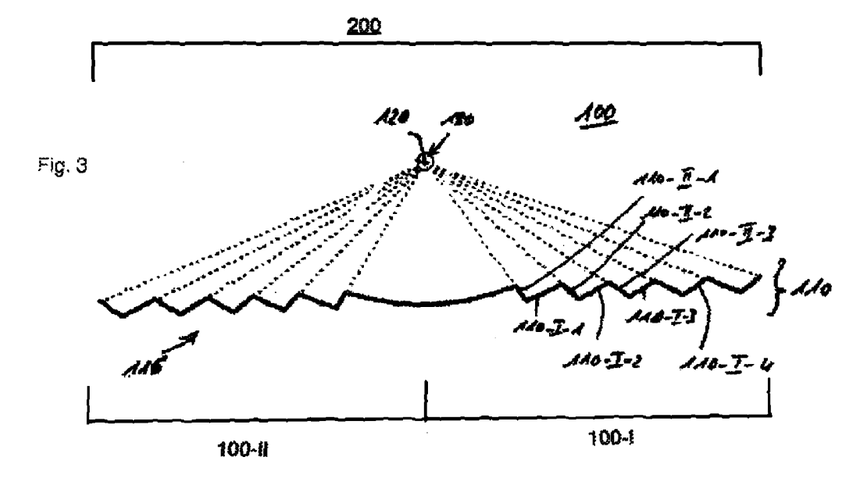
FIG. 3 a collector arrangement.

FIG. 3 shows a collector arrangement in which two collectors according to FIG. 1 are connected with each other through a parabolic reflector section P. The design and the functioning of the reflector device basically correspond to the design and functioning of a single collector 100 as described above referring to FIG. 1. As a specialty of the collector arrangement 200 according to FIG. 3 can only be stated that the two involved collectors 100-I and 100-II are connected with each other in such a way that the focusing zone of the first collector 100-I is overlapping with a focusing zone of the second collector 100-II. This has the advantage that only one absorber device 120 is required to absorb the heat in the overlapping focusing zone 130. This is heated up especially high and therefore is used for the absorption of the high-temperature heat.

The collector arrangement 200 shown in FIG. 3 can be designed either elongated into the drawing plane or circular. In the first case, the focusing zone represents a focusing line or a focusing axis, while in the latter case it would be globular or point-shaped.

Figure 4:
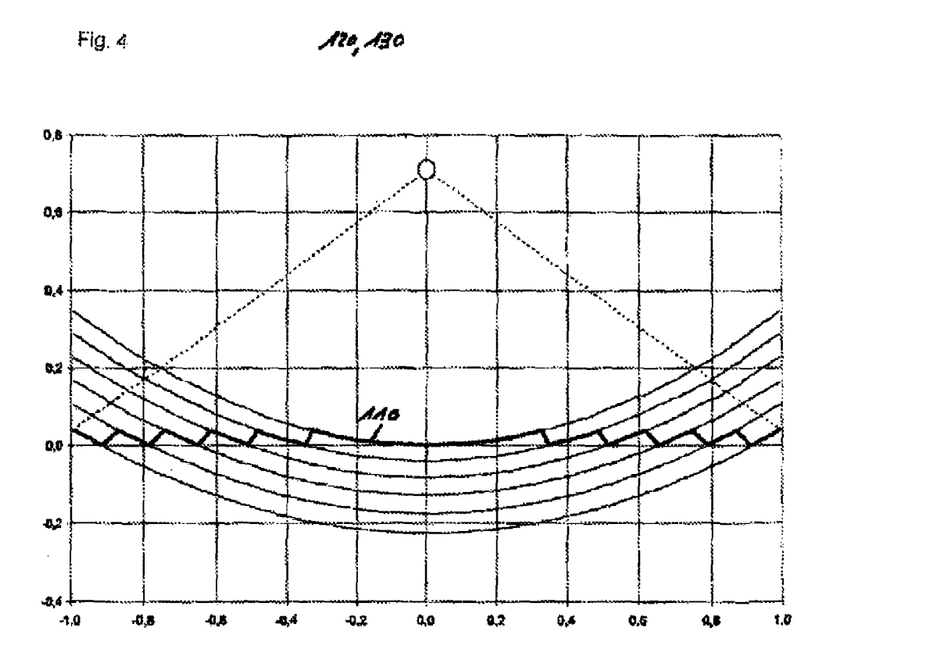
FIG. 4 a diagram to demonstrate the construction of the collector arrangement.
Figure 5:
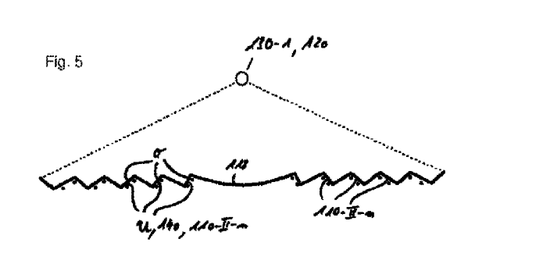
FIG. 5 a first alternative of the collector arrangement.

FIG. 4 shows mainly the reflector device 110 known from FIG. 3, but according to a first alternative which stipulates that the facet elements in FIG. 3 of the second group II not used for heat absorption, namely the elements 110-II-n with n=1-3, can be used additionally for heat generation here. This is done through the design shown in FIG. 5 in that way that the facet elements 110-II-n are designed to be heat absorbing on their upper side O facing the incident radiation, preferably they have there a heat absorbing layer. At the same time, their under side U not facing the incident radiation has a facet element absorber device 140 that transports the heat especially absorbed on the upper side O. The facet element absorber device 140 is designed preferably in correspondence with the first and second absorber appliance, in need be significantly smaller however, as at least the different flow channels must find room on the under side U of the facet elements 110-II-n. The flow channels below the different facet elements are preferably connected with each other and together build the facet element absorber device 140. This is typically not heated up as strongly as the first and second absorber appliance 120-1 and 120-2 and therefore is used to generate low-temperature heat as opposed to the first and second absorber appliance.

Figure 6:
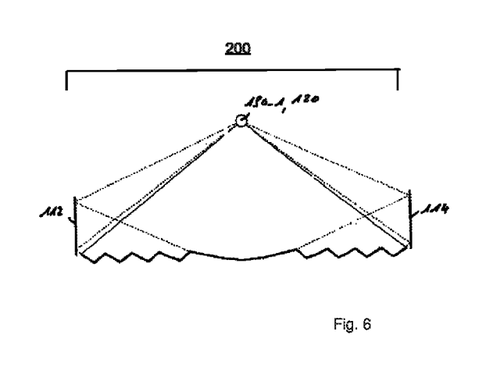
FIG. 6 a second alternative of the collector arrangement.

FIG. 6 shows a second alternative of the collector arrangement 200 according to FIG. 3; also here the focussing elements 110-I-i focus the incident radiation onto the first focusing zone 130-1; this is indicated in FIG. 6 by the two thin solid lines which are drawn from the right and left edge of the reflector device 110 each to the first focusing zone 130-1. As opposed to the first alternative shown in FIG. 5, here, the facet elements of the second group II do not have an absorbing but a reflecting layer on their upper side. They reflect therefore the incident rays firstly onto the right and left edge of the collector arrangement 200. According to the second alternative, the reflecting rays will there hi side reflectors 112, 114 that divert or reflect them as well onto the first focusing zone 130-1 of the collector arrangement 200. If the collector arrangement is designed circular, the two side reflectors 112, 114 can be in one piece in form of a circular ring. Due to the diversion caused by the side reflectors 112, 114 the absorber device 120 located in the first focusing zone 130-1 is heated up more strongly.

Figure 7:
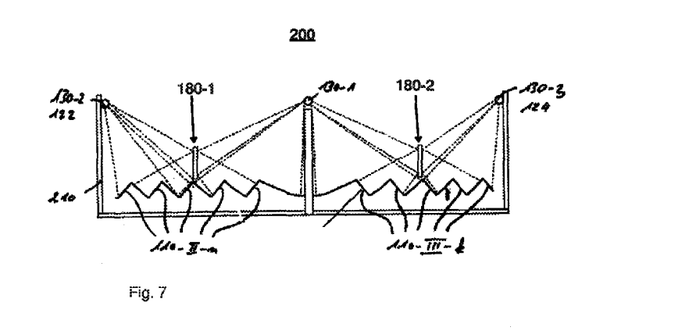
FIG. 7 the collector arrangement installed into a rack.

FIG. 7 shows the collector arrangement 200 according to the invention, mounted into an adequate rack 210. The rack 210 serves to take for example two collectors 100-I and 100-II which each are designed according to the design example described above referring to FIG. 1. The different components of the collectors 100-I, 100-II, i.e. their respective reflector appliances 110-I, 110-II and their absorber appliances 120-1 . . . -3 are each fixed within the rack and are aligned towards each other with regard to an optimal heat absorption. It has to be stated especially, that two focusing zones of the two collectors 100-I and 100-II overlap in the middle of the rack in the central focusing zone 130-1. All focusing zones 130-1 . . . -3 will have an adequate absorber device 120-1 . . . -3 each. Above the collectors 100-I, 100-II, double-sided operating reflectors 180-1, 180-2 can be installed, preferably vertically to the plane along which stretch the corresponding reflector appliances 110-I, 110-II. These reflectors 180-1, 180-2 reflect the radiation reflected from the reflector appliances 110-I, 110-II onto one of the three focusing zones 130-1 . . . -3. The rack 210 can be either elongated or circular corresponding to the collector arrangement. It is preferably covered by an adequately cut glass cover. The glass cover on the one hand advantageously increases the heat development within the rack and on the other hand is much easier kept clean, especially as opposed to the facet reflector device 110-I and 110-II, through which a high degree of efficiency can be kept easily.

Figure 9:
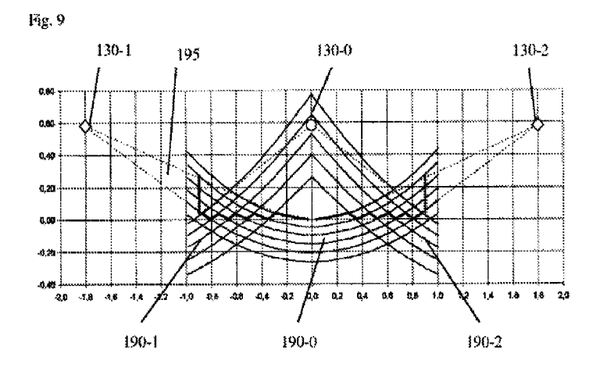
FIG. 9 a multi-functioning facet reflector with secondary reflectors.

FIG. 9 shows a double effective facet reflector/collector which uses the entire structure's surface to focus the solar radiation into a bundle of rays (195). Here, the strips of the reflector's/collector's primary profile (190-0) that are not focused onto the primary focus (130-0) also have a parabolic profile and are aligned in such a way that they reflect the incident rays onto at least one secondary focus axis located outside the collector. Along the two longitudinal edges of the collector, there are secondary reflectors that correspond to the secondary parabolic profiles (190-1, 190-2) and which reflect the incident radiation onto the absorber tube of the (neighbouring) collector. The side walls along the longitudinal edges of the collector are therefore made of a non- or low-reflecting material.

Figure 10:
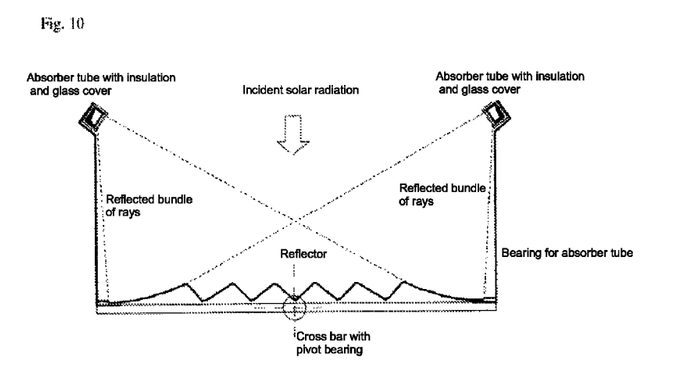
FIG. 10 a multi-functioning facet reflector with cage and rectangular absorber tubes as well as heat insulation and flat glass cover on the absorber area

With the alignment shown in FIG. 10, the device for fastening the absorber tubes to the collector can be integrated advantageously into a stable, box-shaped overall construction of the collector, and at low costs. The absorber tubes can be designed as round tubes, rectangular or as triangular tubes with a larger, flat absorber surface; here, the surface areas not facing the incident radiation have heat insulation. A glass cover can be carried out as an elongated glass pane. This arrangement allows also a tracking of the collectors in correspondence with the sun's position in order to increase the solar output.

The invention claimed is:

1. A collector for the generation of heat from incident radiation comprising: a reflector device (110) to reflect the incident radiation onto at least a first focusing zone (130-1) of the reflector appliance; and an absorber device (120) located within the first focusing zone, which is heated up by the reflected radiation and which is designed to transport the heat; wherein the reflector device (110) comprises of a multitude of facet elements (110-I-i; 110-II-n) which are aligned towards each other in such an angle that the reflector device (110) has a zigzag shaped profile (116); and that the facet element (110-I-i) in a first group (I) out of the multitude each have a reflecting surface and are aligned in such a way that they reflect the incident radiation hitting their reflecting surface via different focal lengths onto the common first focusing zone (130-1) and a first absorber device of the reflector device (110) wherein the first focusing zone shape is selected group consisting of a line shape, a globular shape and a point shape, and wherein the facet elements (110-II-n) in a second group (II) out of the multitude each have a heat absorbing upper side (O) facing the incident radiation, and have at their underside (U) not facing the incident radiation a facet element absorber device (140) in order to transport the heat especially absorbed on the upper side (O) and wherein the separate facet elements form a concentric truncated shaped ring, so that the first focusing zone is point-shaped.

2. The collector (100) according to claim 1, wherein the flow channel of the facet element absorber device (140) is designed in a ring-shape and concentric with the reflector device.

3. The collector (100) according to claim 1, wherein the collector is combined with at least one other collector to form a collector arrangement (200).

4. The collector (100) according to claim 3, wherein the collector arrangement (200) is designed so that several of the focusing zones overlap.

5. The collector (100) according to claim 4, wherein the collector arrangement (200) comprises at least two collectors (100) connected with each other via a parabolic shaped reflector section.

6. The collector (100) according to claim 4, wherein the collector arrangement (200) further comprises a rack in which the separate collectors are mounted.

* * * * *